US 6,575,069 B1
United States Patent
Harwarth et al.

(10) Patent No.: US 6,575,069 B1
(45) Date of Patent: Jun. 10, 2003

(54) DEVICE AND METHOD FOR ADJUSTING A CUTTING GAP

(75) Inventors: Georg Harwarth, Alzenau (DE); Horst Müller, Bingen (DE); Michael Schuler, Grossostheim (DE)

(73) Assignee: Reiter Automatik GmbH, Grossostheim (DE)

( * ) Notice: Subject to any disclaimer, the term of this patent is extended or adjusted under 35 U.S.C. 154(b) by 114 days.

(21) Appl. No.: 09/787,138

(22) PCT Filed: Jul. 13, 2000

(86) PCT No.: PCT/EP00/06693

§ 371 (c)(1),
(2), (4) Date: May 17, 2001

(87) PCT Pub. No.: WO01/05562

PCT Pub. Date: Jan. 25, 2001

(30) Foreign Application Priority Data

Jul. 16, 1999 (DE) .......................... 199 33 497

(51) Int. Cl.⁷ .................................. B26D 5/08
(52) U.S. Cl. .................. 83/583; 83/74; 83/699.51; 83/699.61; 83/906
(58) Field of Search ................ 83/74, 699.61, 83/699.51, 583, 906

(56) References Cited

U.S. PATENT DOCUMENTS 1,963,873 A * 6/1934 Smith .................. 269/291
2,782,853 A 2/1957 Heffelfinger
5,313,864 A * 5/1994 Forgash et al. ............ 83/349

FOREIGN PATENT DOCUMENTS

| DE | 3620015 | 11/1986 |
| DE | 692 11672 | 6/1996 |
| EP | 0 318 174 | 5/1989 |
| EP | 0 841 132 | 5/1998 |
| FR | 555151 | 6/1923 |
| GB | 2266487 | 11/1993 |

* cited by examiner

Primary Examiner—Allan N. Shoap
Assistant Examiner—Isaac Hamilton

(57) ABSTRACT

The invention relates to a device for setting the cutting gap between a rotor, having cutting blades and rotatable about its rotor axis, and a counter-blade body, which carries a cutting edge, can be fixed in position and can be set relative to the cutting blades of the rotor for optimizing the gap by an adjusting mechanism acting perpendicularly to the rotor axis, the adjusting mechanism having a slide guided in a linear guide, and the linear guide being arranged at an angle deviating slightly from the parallelism to the rotor axis, and the counter-blade body being arranged on the slide in such a way that the parallelism of cutting edge and cutting blade is ensured, or a U-shaped counter-blade body being provided, the legs of which are pressed apart elastically by pressure elements for setting the cutting gap. Furthermore, the invention relates to a method of setting the cutting gap between a rotor and a fixed cutting edge.

11 Claims, 2 Drawing Sheets

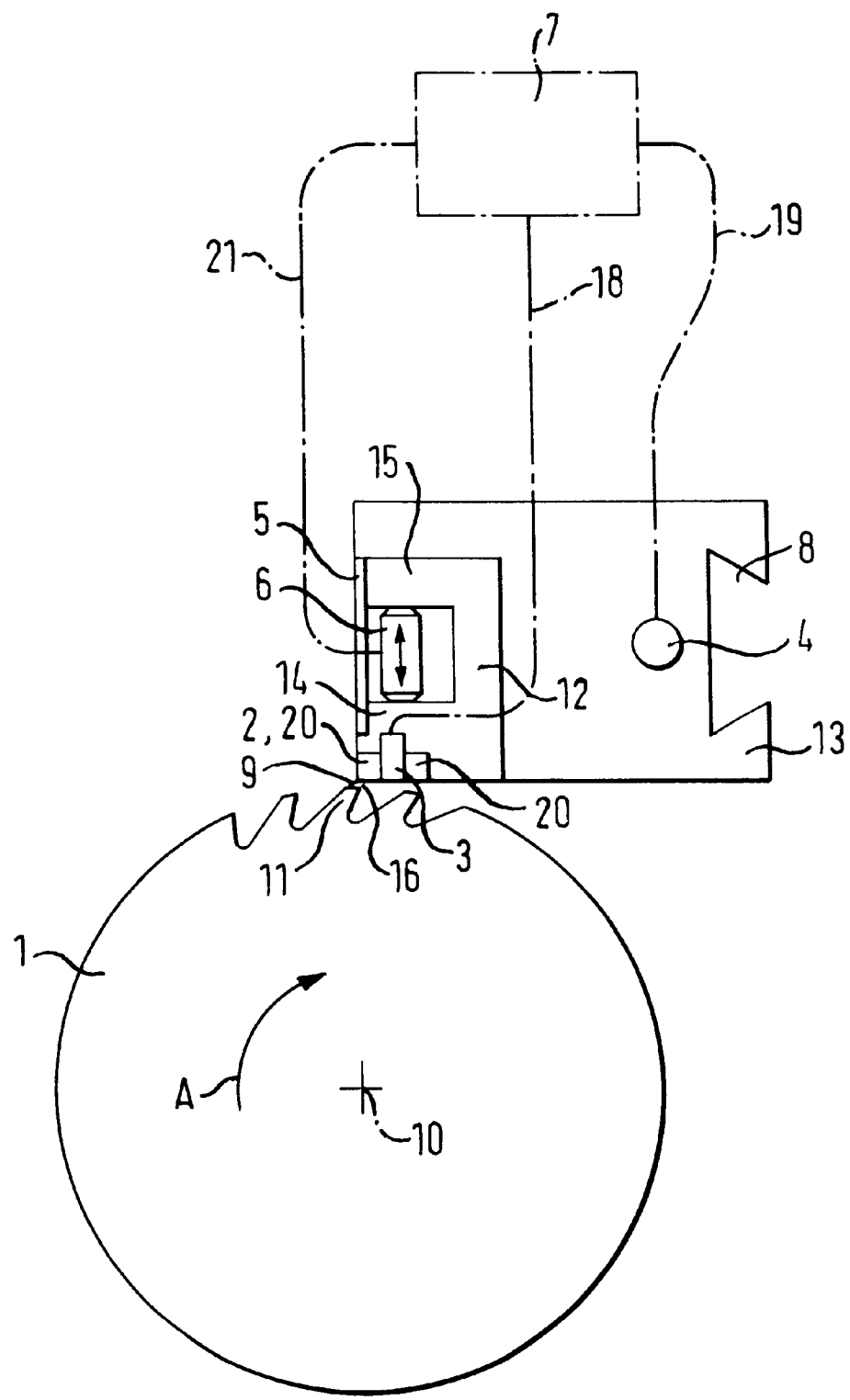

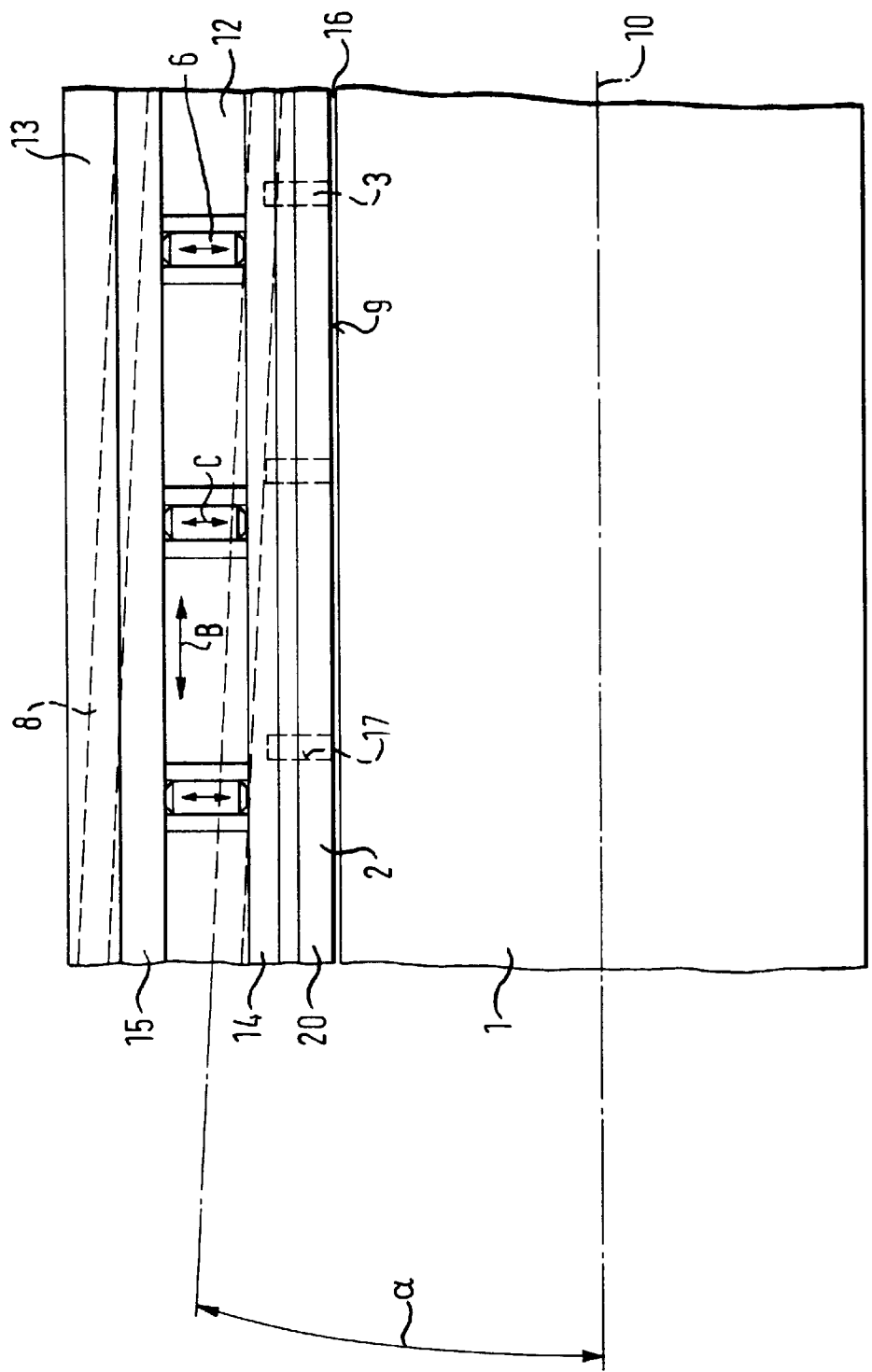

DEVICE AND METHOD FOR ADJUSTING A CUTTING GAP

The present invention relates to a device for setting the cutting gap between a rotor, having cutting blades and rotatable about its rotor axis, and a counter-blade body, which carries a cutting edge and can be fixed in position and to a method of setting the cutting gap.

Such a device has been disclosed by publication DE 36 20 015 A1. In this device, the cutting gap between the rotor having cutting blades and the fixed counter-blade body carrying a cutting edge is set with regard to the rotor axis by two adjusting devices perpendicular to one another. Furthermore, the parallelism relative to the rotor axis is readjusted by two wedge-shaped regulating slides which can be adjusted independently of one another. An adjusting mechanism of such construction for setting the cutting gap requires at least four drives independent of one another in order to accurately align the cutting edge. Furthermore, the known device has the disadvantage that a readjustment of the cutting gap can only be effected when the machine is stopped, i.e. when the rotor having cutting blades is stopped, for example by means of feeler gauges or other measuring aids.

DE 692 11 672 T1 discloses a cutting apparatus having a blade roller comprising a blade which is radially adjustable within the roller body by a linear guide and is held in position by spring elements.

EP 0 841 132 discloses a method in which a cutting blade or a smooth counter roller are heated or cooled by heating elements and cooling elements respectively, to set the cutting gap.

EP 0 318 174 discloses a cutting edge supported by one leg of a U-shaped carrier, wherein screws are used to decrease the distance between the legs of said U-shaped carrier to set the gap during maintenance.

The object of the invention is to provide an adjusting mechanism which can be set and readjusted by means of a drive unit even during operation while preserving the parallelism between the rotatable rotor, having cutting blades, and the cutting edge.

To achieve this object, it is envisaged to use pressure elements as the drive unit for setting the cutting gap. To this end, the counter-blade body has a U-shaped profile, with a first leg which forms the cutting edge and a second leg which supports the counter-blade body. Pressure elements for elastically bending the counter-blade body apart for the fine setting of the cutting gap are arranged between the first and the second leg of the U-profile-shaped counter-blade body.

This solution has the advantage that, even within the submicrometre range, the cutting gap between cutting edge and cutting blades can also be readjusted during the operation when the rotor with cutting blades is rotating. To this end, the pressure elements press the two legs apart within the submicrometre range and thus press the cutting edge in the direction of the cutting blades of the rotor. The pressure elements used are preferably Peltier elements between the U-shaped legs, these Peltier elements expanding by the application of a variable external voltage and thus bending the legs apart, as a result of which the cutting edge is moved towards the rotor within the submicrometre range. In addition, this arrangement has the advantage that a feedback loop can be used between a sensor and a Peltier element, so that the cutting gap can be adapted within the submicrometre range to different operating conditions.

In a preferred embodiment the adjusting mechanism has a slide which is guided in a linear guide and has the counter-blade body with the cutting edge, the linear guide being arranged at an angle deviating slightly from the parallelism to the rotor axis, and the counter-blade body being fastened to the slide in such a way that the parallelism of cutting edge and cutting blade remains ensured. The counter-blade body therefore has an extremely acute angle relative to the slide, and this acute angle corresponds to the acute angle between rotor axis and linear guide, so that the counter-blade body with its cutting edge remains completely parallel to the rotor axis during the adjustment of the slide on the linear guide.

Such an adjusting mechanism not only has the advantage of a single central linear guide with which the adjustment of the cutting edge relative to the blades of the rotor becomes possible but also provides an adjustment in the two spatial directions, known from the prior art and perpendicular to one another, relative to the rotor axis with only one linear guide. This means a substantial saving in material and costs compared with the previous solutions and offers the possibility of automating the adjustment, especially as only one drive unit becomes necessary for the linear guide arranged at an acute angle to the rotor axis. In addition, it is possible, for example in the event of thermal expansion of the rotor during the operation, to continuously compensate for and adapt the thermal expansion of the rotor in its effect on the setting of the cutting gap via the automatic adjustment of the slide on the linear guide.

In addition, the U-shaped counter-blade body has the advantage that the first leg, which carries the cutting strip, is elastically deformable and flexible, so that faults due to microscopically fine solid particles, for example in the plastic strands, cannot lead to the total failure of the cutting edge or cause permanent damage to the blade body.

In a preferred embodiment, the counter-blade body has at least one sensor for recording a measurable distance variable between the cutting edge of the counter-blade body and the cutting blades of the rotating rotor. This is associated with the advantage that, to readjust or match the setting of the cutting gap during operation, no empirical values have to be recorded in tabular form and stored in order to adapt the setting of the cutting gap to the operating conditions in an optimum manner, but rather measurable distance variables can be recorded by the sensor and the cutting-gap depth can be kept at a set point by means of a corresponding control arrangement.

To form a cutting edge, the counter-blade body preferably has a cutting strip which preferably extends over the full length of the counter-blade body. Such a cutting strip has the advantage that it can be exchanged at any time without at the same time having to produce a new counter-blade body.

In a preferred embodiment of the invention, the pressure elements used are thermal pins, which produce a change in length either on account of increasing ambient temperature or on account of active heating or cooling and thus bring about a change in the elastic bending-apart of the blade body, so that it becomes possible to set the cutting gap and, if a sensor is used, control the cutting gap during the operation.

Finally, the pressure elements which can be used are preferably hydraulically or pneumatically driven actuators between the legs of the counter-blade body, which actuators, however, have to be specially designed with regard to space and feed requirements. Possible pressure elements are also preferably motor-driven actuators, which can preferably be set via a common camshaft.

The open flank of the U-profile-shaped counter-blade body preferably has a cover, which has the advantage that the pressure elements are protected from splashing water and granules.

In a further preferred embodiment, openings, aligned with one another, in the cutting strip and in the counter-blade body ensure recording of the cutting-gap depth by means of at least one sensor. This sensor is preferably arranged in the centre region, so that arching of the counter-blade body in the centre region is directly recorded and, when there are pressure elements between the legs of a U-profile-shaped counter-blade body, the widening of the cutting gap in the centre region can be compensated for directly.

When two sensors are used, these sensors are uniformly distributed over the length of the counter-blade body, so that the counter-blade body has three regions between which sensors are arranged for recording the cutting-gap depth. By interaction of preferably at least three pressure elements with one or more sensors, load-induced and/or temperature-induced changes in the cutting gap, via a control loop with feedback of the cutting-gap variables recorded by sensors to a control unit, can be compensated for by the pressure elements in the blade body. To this end, the setting of the counter-blade body can advantageously be regulated with the pressure elements between 0.01 mm and 0.5 mm at an accuracy of 0.001 mm. The control unit can also effect an interaction between slide and linear guide for a coarse readjustment of up to 10 mm in the distance between the blades of the rotor and the cutting edge of the counter-blade body.

The slide can also be adjusted relative to the linear guide by a micrometer gauge, which is driven automatically by a stepping motor and which, if necessary, is connected by feedback to one of the sensors via the control unit. Through the use of a micrometer gauge and an acute angle, the coarse setting may also be used for the fine adjustment within the submillimetre range, but only if no deformation of the counter-blade body occurs or if deformation which occurs does not lie within the submicrometre range.

The present invention is suitable in particular for the use of the device for the granulation of thermoplastic strands. Such plastic strands are forced in the molten state from a die plate and are normally cooled to a temperature below the melting temperature, so that non-adhesive plastic strands can be fed via a roll pair to the cutting blades of a granulating device.

The invention preferably also relates to a method of setting the cutting gap between a rotor, having cutting blades and rotatable about its rotor axis, and a counter-blade body, which carries a cutting edge, can be fixed in position and can be set relative to the blades of the rotor for optimizing the gap by means of an adjusting mechanism acting perpendicularly to the rotor axis. Such a method has the following steps:

1. Recording of a cutting-gap depth when the rotor is rotating and the counter-blade body is fixed by means of at least one sensor
2. Fine regulation of the cutting-gap depth in interaction between the sensor and a micrometer-gauge drive of a linear guide, which is arranged at an acute angle to the rotor axis and the slide of which keeps the cutting edge of the counter-blade body parallel to the rotor axis
3. Readjustment of the cutting gap by means of a control unit, which compares the recorded cutting-gap depth with predetermined set points and optimally regulates the cutting-gap depth via the micrometer gauge drive This method according to the invention has the advantage over the prior art that only one actuating drive and one sensor as well as one control unit are required in order to optimally regulate the cutting-gap depth. However, no deformation and/or deflection of the cutting edge of a counter-blade body can be compensated for with this method. This is achieved by a method having the following steps:

1. Recording of a cutting-gap depth when the rotor is rotating and the counter-blade body is fixed by means of at least one sensor
2. Coarse approach of the cutting edge to the rotating cutting blades with adjustment of a slide relative to a linear guide, which is arranged at an acute angle to the rotor axis
3. Fine regulation of the cutting-gap depth by monitoring the cutting gap during operation by means of at least one sensor arranged in the counter-blade body in interaction with a control unit
4. Analysing and comparing the measured distance variables between rotating rotor and fixed cutting edge with set points in the control unit
5. Correction of the cutting gap by means of adjusting instruction to pressure elements, which are arranged in the counter-blade body and act on an elastic leg which carries the cutting edge of the counter-blade body This method has the advantage that even the smallest deflections and wear of the cutting edge even within the submicrometre range can be readjusted and compensated for during operation, so that the cutting edge, with predetermined cutting gap, can be held rectilinearly and in parallel relative to the cutting blades of the rotor.

Further advantages, features and possible uses of the invention will now be explained in more detail with the aid of an exemplary embodiment and with reference to the attached drawings.

FIG. 1 is a diagrammatic cross section of an arrangement of a device for setting the cutting gap in an embodiment of the present invention, FIG. 2 is a detail of a longitudinal section of an embodiment of the present invention.

FIG. 1 shows a device for setting the cutting gap between a rotor 1, having cutting blades 11 and rotatable about its rotor axis 10, and a counter-blade body 12, which carries a cutting edge 9, can be fixed in position and can be set relative to the cutting blades 11 of the rotor 1 for optimizing the gap by means of an adjusting mechanism acting radially relative to the rotor axis 10. To this end, the adjusting mechanism, as clearly shown in FIG. 2, has a slide 13 guided in a linear guide 8. To this end, the linear guide 8 is arranged at an acute angle a to the rotation axis 10, and the counter-blade body 12 is arranged on the slide 13 in such a way that the parallelism of cutting edge 9 and cutting blades 11 is ensured.

A sensor element 3 is arranged for recording a measurable distance variable between the cutting edge 9 of the counter-blade body 12 and the cutting blades 11 of the rotating rotor 1.

Since in this embodiment the counter-blade body 12 has a cutting strip 20 for forming a cutting edge 9, an opening 17 for accommodating the sensor is made in the cutting strip 20 in the direction of rotation of the rotor, which is shown by the arrow A, this opening being aligned with an opening in the counter-blade body in order to accommodate a sensor 3, which, for example, is deeper in its dimensions than the thickness of the cutting strip 20.

The sensor 3 produces a signal which corresponds to the distance variable between the cutting blades 11 of the rotor 1 and the cutting edge 9 of the counter-blade body 12 and which is fed via the feed line 18 to a control unit 7. This control unit compares the recorded distance variable with correspondingly stored and predetermined set points and gives an actuating instruction via the line 19 to a preferably stepping-motor-driven micrometer gauge, which acts on the adjusting drive 4 and displaces the slide 13 in the linear guide 8 at an acute angle to the rotor axis 10, so that the gap depth changes. In this way, the setting of the cutting gap can also be advantageously continuously adapted and readjusted during operation. The cutting-gap depth overall, i.e. for the entire cutting edge 9, can simply be changed or readjusted relative to the cutting blades 11 of the rotor 1 with the linear guide 8 alone. In a pre-adjustment, a diameter variation of the rotor of 10 mm can be compensated for by means of the linear guide. On account of the stepping-motor-driven micrometer gauge, the cutting-gap depth can be readjusted within the submillimetre range during operation.

FIG. 1, in addition to the fundamental controllability of the cutting-gap depth by means of a linear guide, shows a further readjustment by setting the cutting gap by means of special shaping of the cross section of the counter-blade body 12. In this embodiment according to FIG. 1, the counter-blade body 12 has a U-shaped cross section with a first leg 14 and a second leg 15. Sketched between the legs 14 and 15 in this diagrammatic sketch of FIG. 1 is a pressure element 6, which in this embodiment constitutes a thermal pin. This thermal pin can be heated, so that it expands and presses the two legs of the U-profile-shaped counter-blade body 12 apart. To this end, the thermal pin can be kept at different temperatures by means of a heating current, which is supplied via the feed line 21.

A plurality of thermal pins may be fitted between the legs 14 and 15 so as to be distributed over the length of the counter-blade body 12 and interact with the control unit 7 via the feed line 21. Bending and arching of the cutter edge are thus advantageously compensated for by virtue of the fact that the first leg is elastically deformed within the micrometre range between 0.5 μm and 0.5 mm relative to the second leg 15 by different heating of the thermal pins, so that the cutting edge 9 is pressed in the direction of the cutting blades 11 of the rotor 1. To this end, the second leg 15 of the counter-blade body 12 is supported against the slide 13, a cover 5 over the open flank of the U-profile-shaped counter-blade body 12 protecting both the sensor and the pressure element from contamination.

In this embodiment, the sensor 3 comprises an eddy-current measuring instrument, which transmits electrical signals via the feed line 18 to the control unit 7 as a function of the distance from the rotor. However, optical and electronic or electroacoustic sensors are also advantageously suitable for this use.

FIG. 2 shows the detail of a longitudinal section of an embodiment of the present invention for setting the cutting gap. To this end, a plurality of sensors 3 and a plurality of pressure elements, in this detail three sensors 3 and three pressure elements, are arranged in an offset manner in the longitudinal direction in the counter-blade body 12 designed in a U-profile shape. The cover 5, which can be seen in FIG. 1, has been omitted in FIG. 2 in order to show the position of the pressure elements 6. The pressure elements 6 are clamped between the legs 14 and 15 of the counter-blade body 12 and react in this embodiment as thermal pins to a heating current, which is delivered by the control unit 7.

Broken lines identify the direction of the linear guide, the slide 13 of which carries the counter-blade body 12 and keeps it parallel to the circumference and to the axis 10 of the rotor 1. The acute angle α, at which the linear guide 8 comes into effect relative to the rotor 1, becomes apparent from the broken lines of the linear guide 8. The slide 13 can be displaced in arrow direction B relative to the fixed linear guide by a stepping motor (not shown). During this displacement, the cutting gap is changed in a parallel manner. In particular, deformations and bending of the cutting edge 9 over its length relative to the rotor can be compensated for within the submicrometre range by the pressure elements 6, which elastically bend the legs 14 and 15 of the counter-blade body 12 apart.

What is claimed is:

1. An apparatus for setting a cutting gap comprising:
   a rotor having cutting blades and being rotatable about its rotor axis;
   a U-shaped counter-blade body fixed in position relative to said cutting blades, said body including a first leg and a second leg in opposition thereto connected by a connecting bridge portion, said first leg having a cutting edge in opposition to said cutting blades of said rotor to define a cutting gap therebetween;
   an adjustment mechanism providing movement of said counter-blade body relative to said rotor axis to provide adjustment to maintain said cutting edge and said rotor axis in substantially parallel relation to one another, said adjustment mechanism comprising a pressure element disposed between said first and second legs of said counter-blade body to press against said legs.

2. The apparatus of claim 1, wherein said adjustment mechanism also comprises a slide movable in a linear guide arranged at an angle deviating slightly from parallelism with respect to said rotor axis, said slide receiving said counter-blade body such that parallelism between said cutting edge and said cutting blades is maintained during adjustment of said cutting gap.

3. The apparatus of claim 2, further comprising a micrometer gauge operated by a stepper motor for positioning said slide.

4. The apparatus of claim 2, comprising a sensor arranged in a central region along said counter-blade body for recording a cutting-gap depth between said cutting edge and one of said cutting blades.

5. The apparatus of claim 4, comprising a plurality of sensors spaced uniformly along said counter-blade body.

6. The apparatus of claim 4, further comprising a control unit connected to said sensor via a control loop to enable feedback control of said cutting gap.

7. The apparatus of claim 1, wherein said counter-blade body has a replaceable cutting strip along said cutting edge.

8. The apparatus of claim 1, further comprising a plurality of pressure elements disposed along said counter-blade body.

9. The apparatus of claim 1, wherein said pressure element is a thermal pin.

10. The apparatus of claim 1, wherein said pressure element is a Peltier device.

11. The apparatus of claim 1, wherein said pressure element is a mechanical actuator.

* * * * *